United States Patent [19]

Weidanz et al.

[11] 3,791,519

[45] Feb. 12, 1974

[54] STORAGE APPARATUS

[75] Inventors: Herbert Weidanz, Odenthal-Globusch; Gerhardt Sandt, Cologne, both of Germany

[73] Assignee: Datagraph A.G., Zug, Switzerland

[22] Filed: Sept. 29, 1972

[21] Appl. No.: 293,513

[30] Foreign Application Priority Data

Oct. 18, 1971 Germany .......................... 2151752

[52] U.S. Cl. .............................................. 209/80.5
[51] Int. Cl. .............................................. B07c
[58] Field of Search .......................... 209/80.5, 110.5

[56] References Cited

UNITED STATES PATENTS 3,669,262 6/1972 Gerlach ............................ 209/80.5
3,713,535 1/1973 Engelstein ........................ 209/80.5

*Primary Examiner*—Allen N. Knowles
*Attorney, Agent, or Firm*—John J. Dennemeyer; Arthur Schwartz

[57] ABSTRACT

Storage apparatus for the cycled selection of a sheet-like records carrier supported with other carriers in a cassette, in which means are provided to bring a chosen carrier in a protruding position in which it can be gripped and pulled out of the cassette by a first frame which transports the carrier to a fixed position. With the carrier in this fixed position reader stations can be positioned to read certain tracks on the carrier, while the carrier can be transported into the cassette from this fixed position.

10 Claims, 21 Drawing Figures

PATENTED FEB 12 1974 3,791,519

SHEET 08 OF 10

STORAGE APPARATUS

The invention relates to a storage apparatus for the cycled selection of a sheet-like records carrier supported together with a plurality of other identical carriers by a rider consisting of a steel band on at least one of its side edges and maintained in a horizontal position, an idented recess is provided in a face surface of the rider disposed vertically to the direction of movement and this recess has in its untensioned state a width that is slightly smaller than the effective cross-section of a rod which is movable crosswise of its longitudinal direction into the recess and is adapted to travel in the pull-out direction while the recess is expanded, wherein the force generated by this expansion is larger than the harmful forces maintaining the records carrier at its original position and which are generated by adhesion, pressure or the like.

In known apparatus of this type the problem of moving sheet-like records carriers by a selective gripping action from a storage position to a work station and storing it back into the storage position has been solved. The procedures were so devised that no longer any undefined sheet-like record carriers can be moved out as had been the case previously by vibrating, shaking, blowing or by magnetic forces. Instead, it is possible to determine in the known apparatus at any time also during the selection process where the records carrier is located so that this is the first time that the storage apparatus can be used together with data handling machines which have also a cycled operation.

The known storage apparatus is designed for a storage capacity in the range of 20–30 × $10^6$ symbols wherein one symbol has 7 bits. Accordingly one obtains for example with DIN A4 size magnetic cards and a known bit density a specific number of magnetic sheets. From this alone one derives already specific connecting values, construction principles and grasping times as well as particularly user possibilities. For some users storage apparatus of this type is too expensive and too large. They would have enough for example with a ten times smaller storage apparatus comprising an easily exchangeable storage content. Of course, it is theoretically possible to hang into the storage space of the known storage apparatus merely one tenth of the records carriers. However, this would constitute a substantial waste.

It is an object of the invention to provide a storage apparatus whose capacity is substantially smaller than that of the known storage apparatus, which provides a simple exchange of the storage location, has a lower electrical connection value, a considerably lower space requirement, and additionally a shorter grasping time.

According to the invention this object is attained in that the records carriers are mounted in a cassette which is open at its rear end wall seen in the pull-out direction, that in comparison with other storage apparatus a relatively small number of records carriers, for example a maximum of two hundred, are mounted in the cassette, that the cassette may be slidingly inserted into a base frame which carries the selector device for the records carrier and has coding rods which reach into coding recesses, that a pivot frame is provided which may be pivoted about a vertical axis in its range remote from the cassette, is higher than the records carrier, and is movable during the pivoting process with its side facing the cassette at the open end wall of the latter essentially up to a selected projecting records carrier, wherein the largest angle between the pivot frame and the records carrier has at a maximum the same size as the maximum permissible supplemental angle of the records carrier which occurs repeatedly during the selection, that the pivot frame has a transport device connected to the rider by which the records carrier is movable in a guide of the pivot frame in the direction of the vertical axis of this frame, that the pivot frame may be pivoted back into its starting position when the records carrier is retracted, that in the base frame a reader-writer device is provided which may be adjusted vertically and whose work plane is located in the plane of the records carrier guided by the return pivoted pivot frame, that opposite the reader-writer device at the pivot frame directly behind the records carrier a large contact surface is provided, that the return transport takes place in the return pivoted position of the pivot frame into the cassette, and that during the straight line return transport the reader-writer device is in the working position.

It is pointed out that although the invention is concerned with sheet-like records carriers which are always larger than the known punched cards and are therefore affected by their own problems, the sheet-like records carriers according to the invention need not be exclusively magnetic sheets, but that the sheets may carry also microfilms supported in pockets, that the records carriers may be inscribed in an other manner which is readable by machine, or the like.

The concept of the invention makes possible a quick exchange of cassettes, which is just as simple as for example the insertion of a magnetic tape cassette into a play-back device or of a transistor radio in a car mount. Instead of moving the cassette it is possible to move a comparatively lighter pivot frame. In that case it is better to move a comparatively lighter pivot frame because the moving of the cassette bring about guiding problems during the sliding movement, and furthermore the drive of the mechanisms associated with the pivot frame is more difficult. The pivot shaft of the pivot frame may be used simultaneously as bearing shaft for a drive wheel by means of which the mechanisms of the pivot frame may be driven. This wheel may be driven like a wheel pertaining to the base frame in an easy manner from that point. Furthermore, this presents the advantage of a completely constant cycling time, and the further advantage that the setting time is equal to the reading time, the writing time or any other working time. The grasping time becomes generally also shorter.

Further advantages and features of the invention may be seen from the following description of a preferred embodiment. In the drawing.

Figure 4:
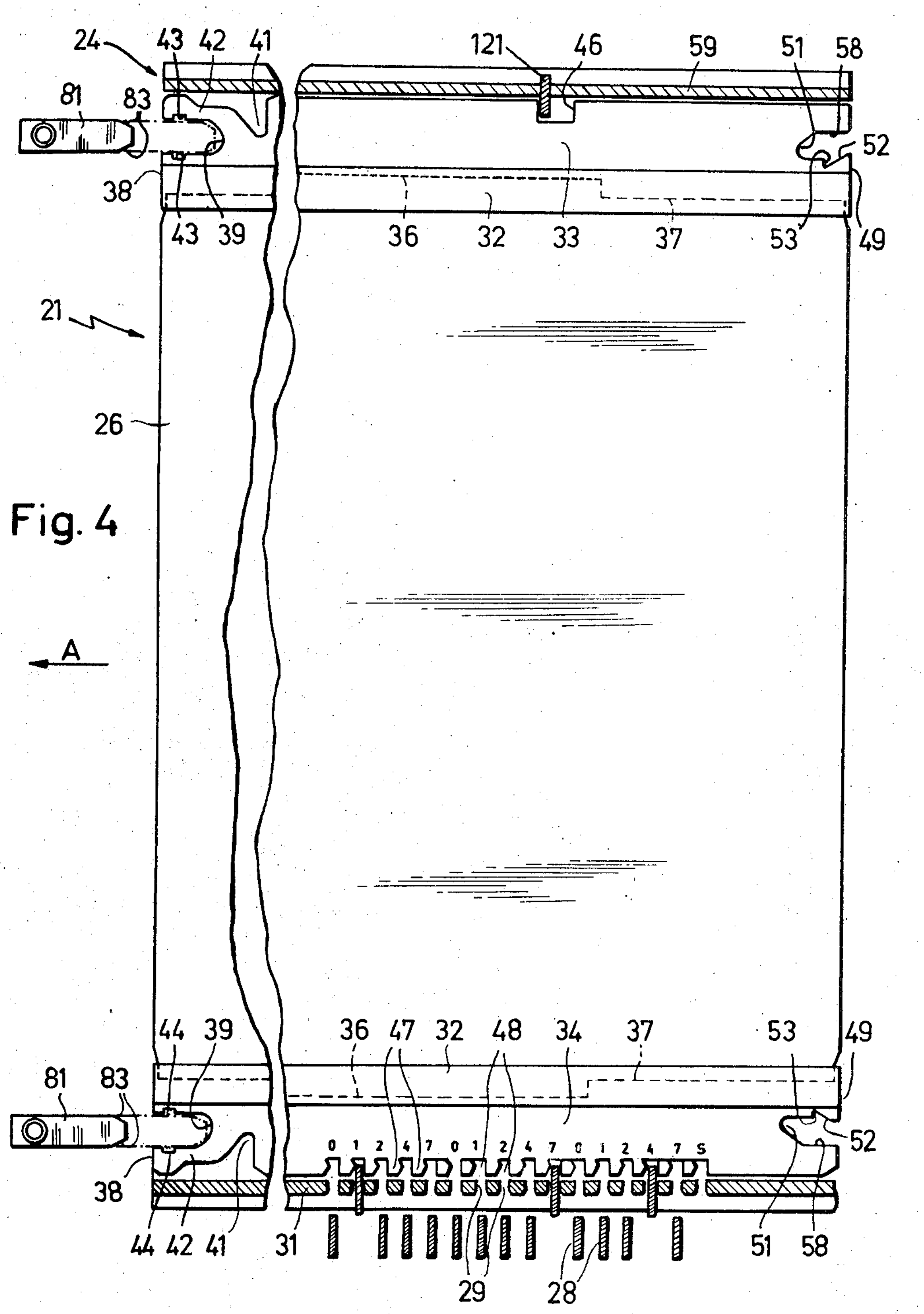
Figure 5:
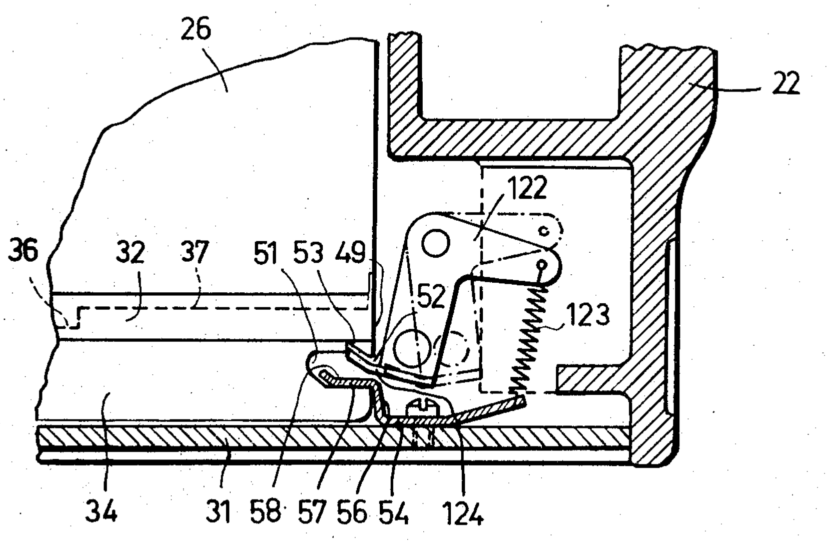
Figure 6:
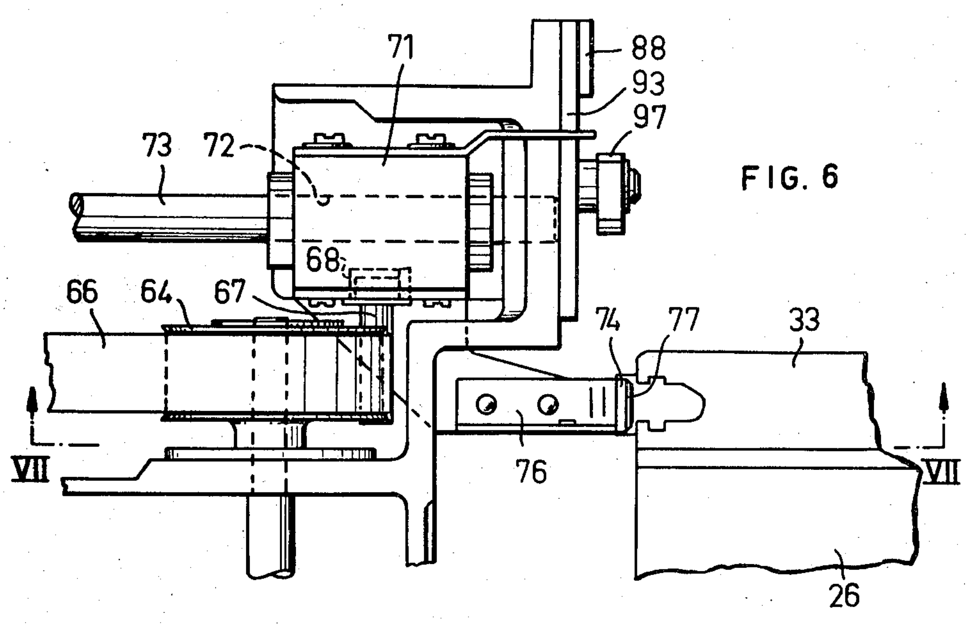
Figure 7:
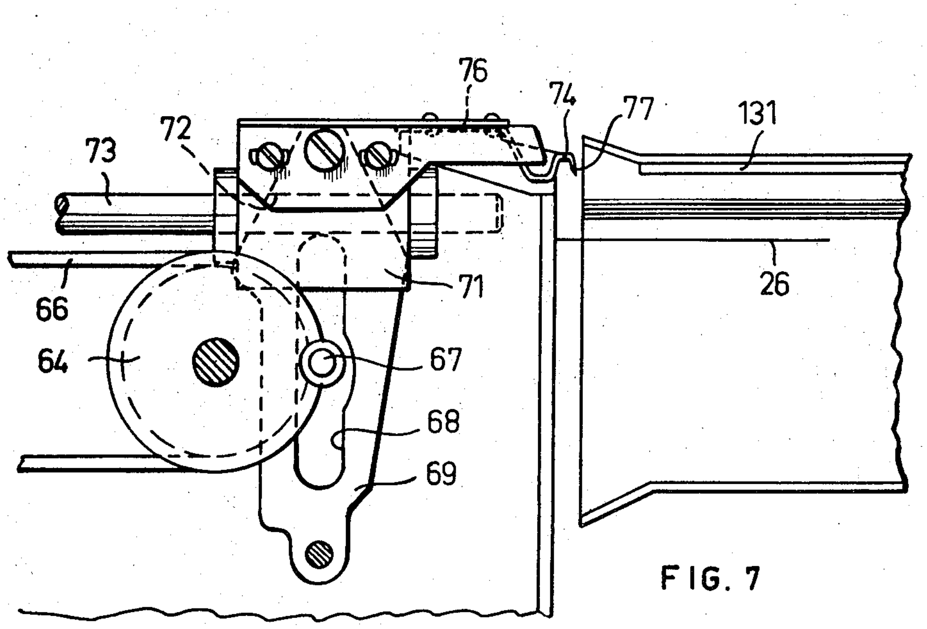
Figure 8:
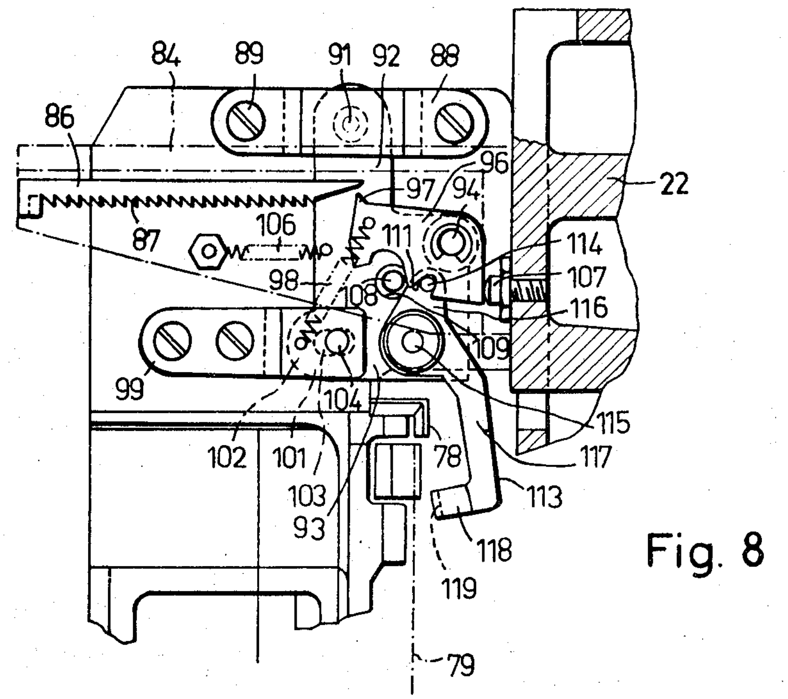
Figure 9:
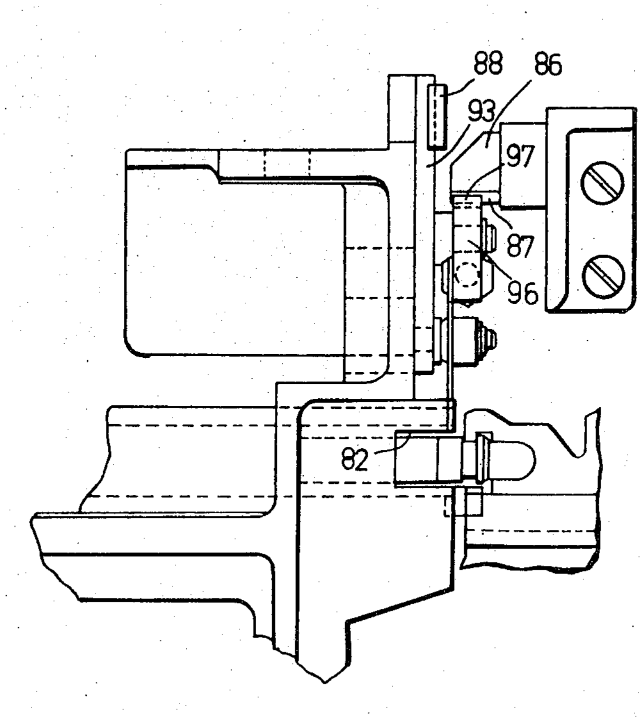
Figure 10:
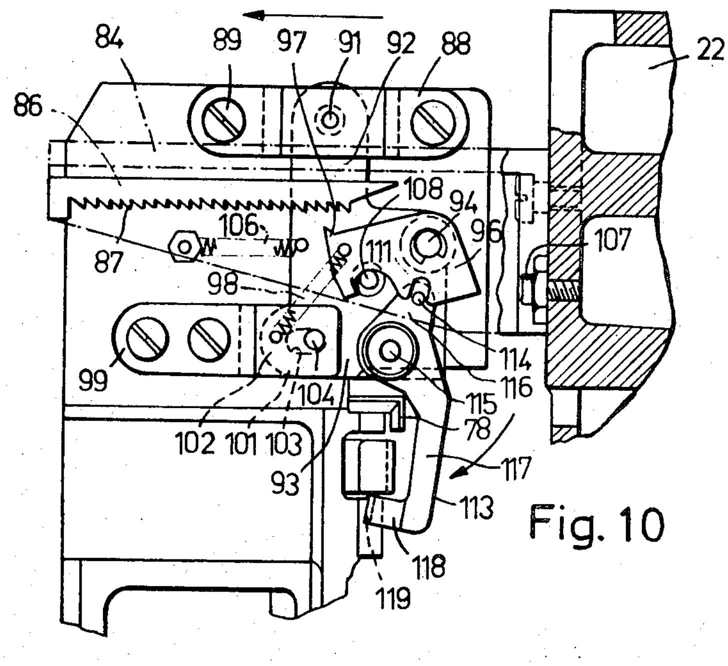
Figure 11:
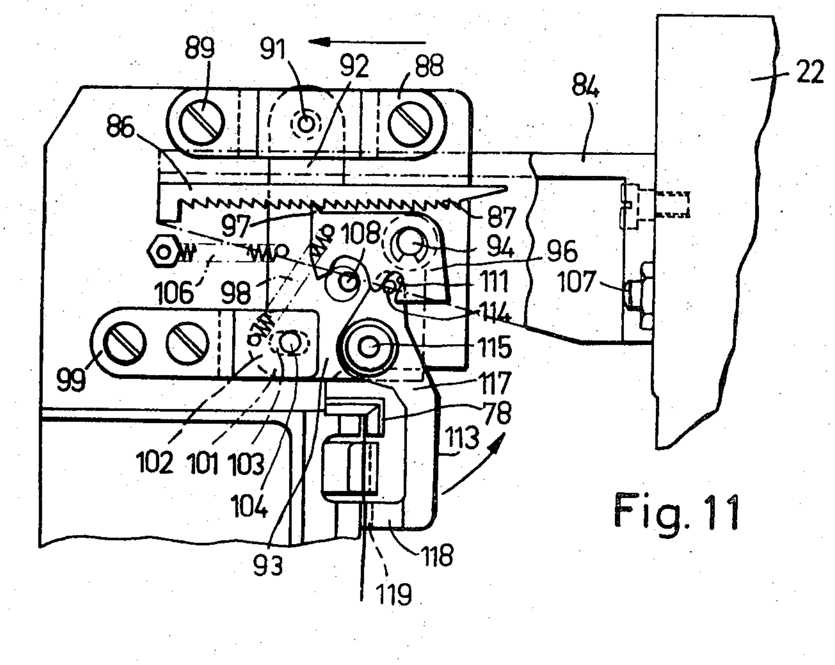
Figure 12:
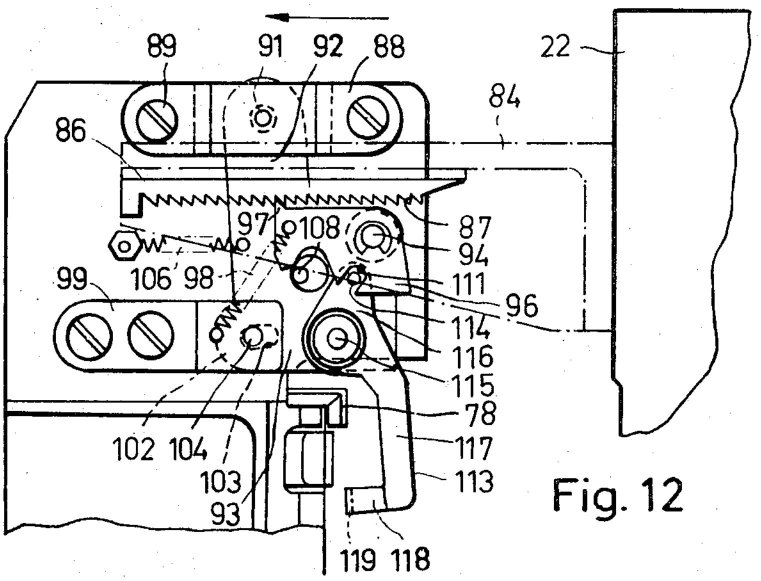
Figure 13:
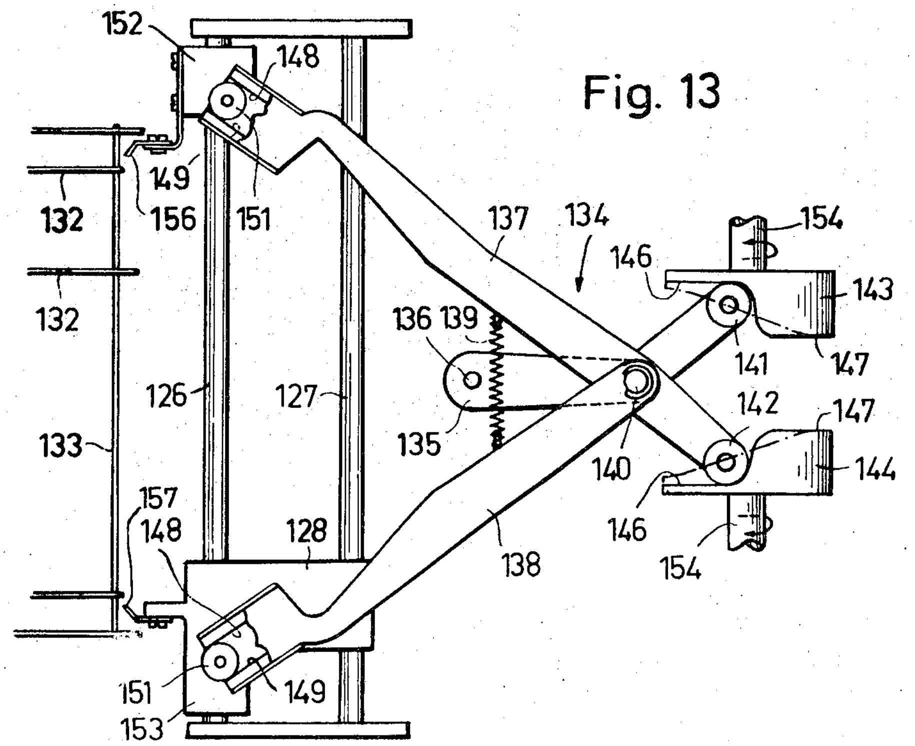
Figure 14:
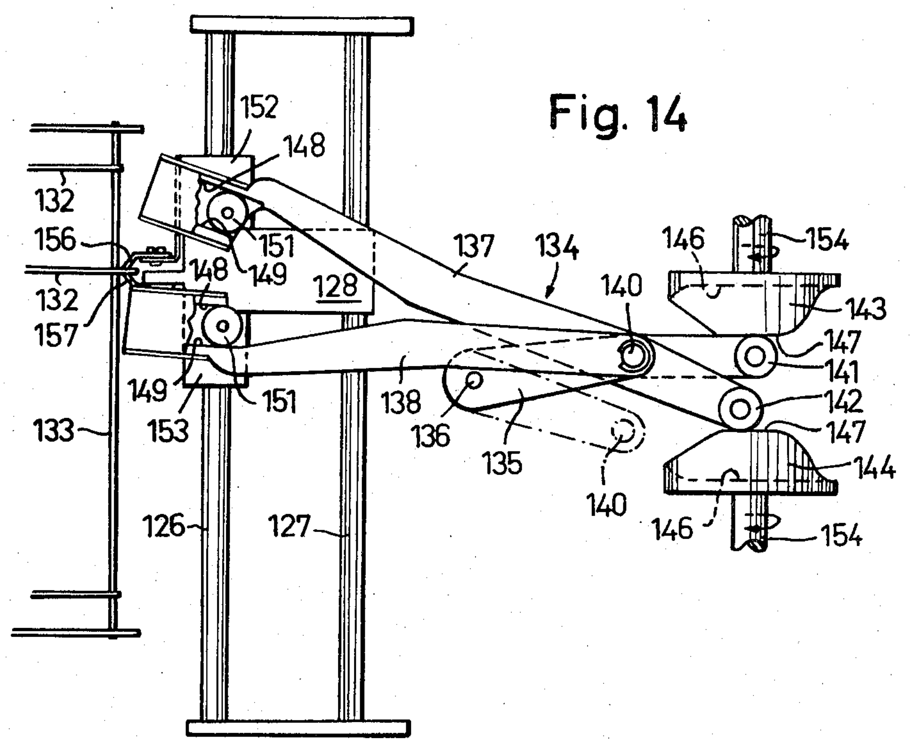
Figure 15:
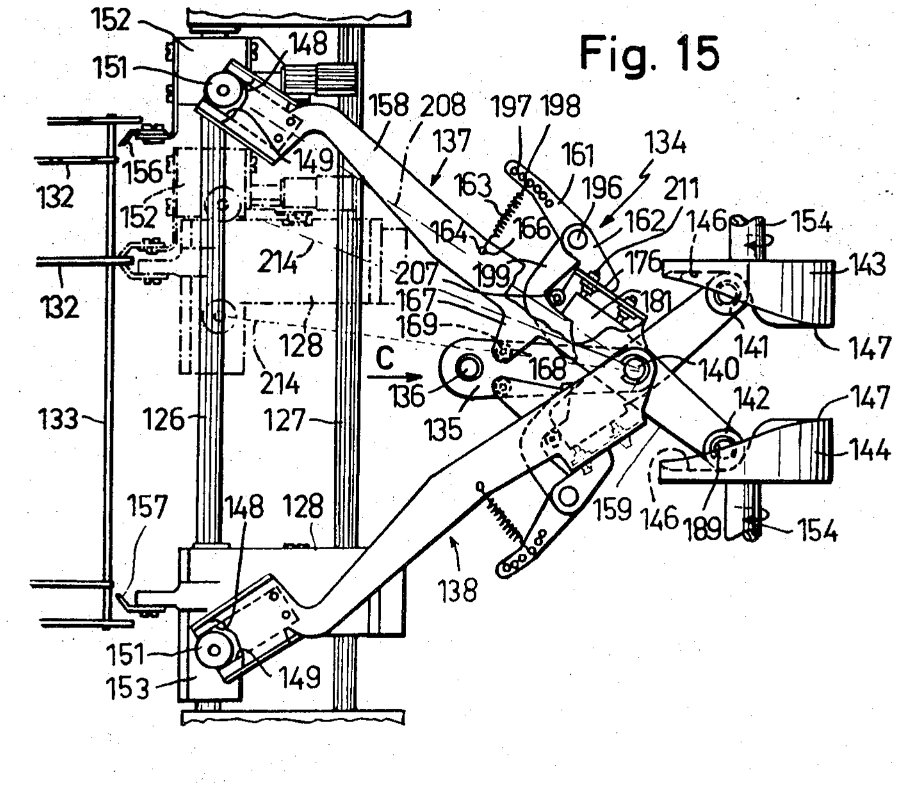
Figure 17:
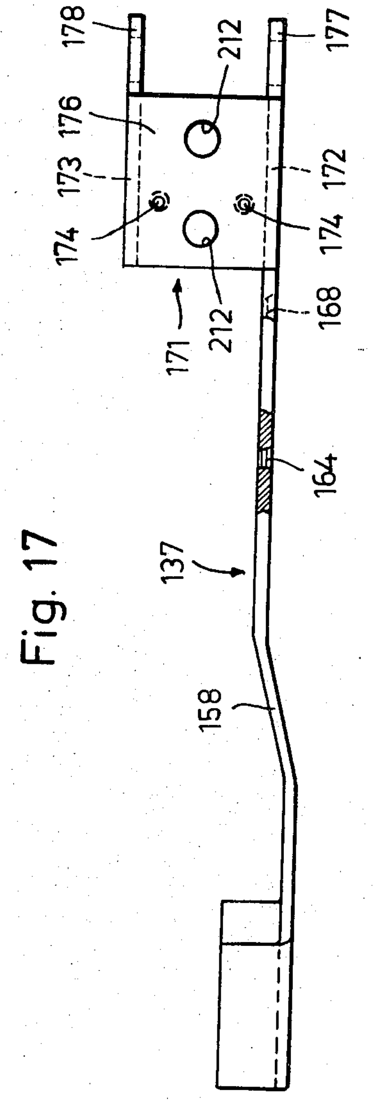
Figure 16:
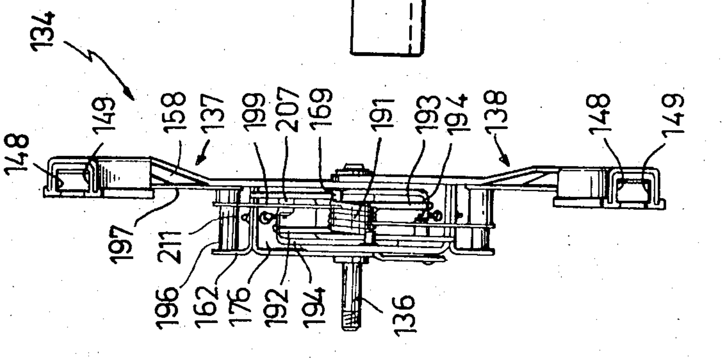
Figure 18:
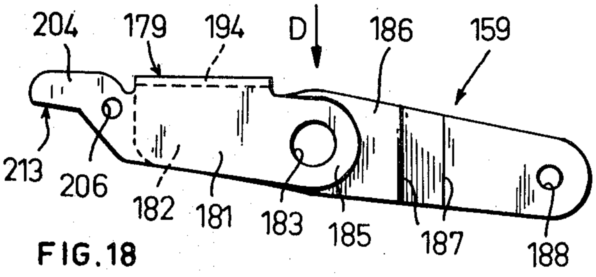
Figure 19:
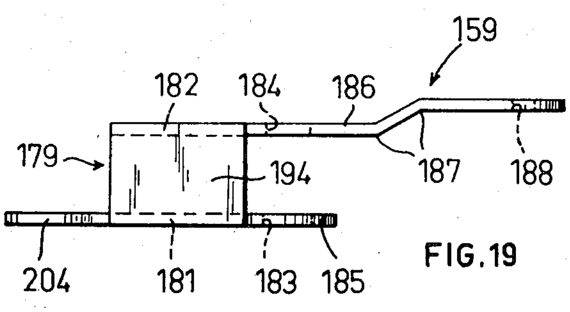
Figure 20:
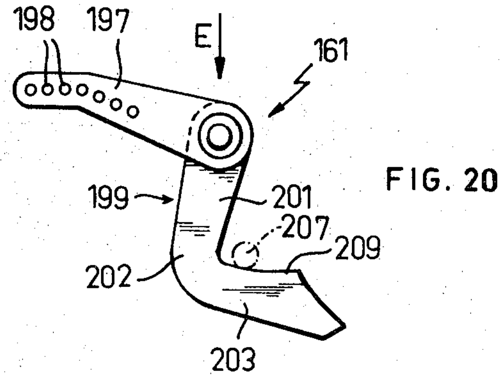
Figure 21:
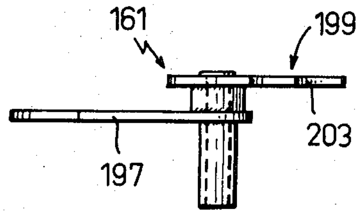

FIG. 4 is a simplified section through the cassette with pull-out rods and selector device, FIG. 5 is an exact vertical section through the right lower corner of the cassette, FIG. 6 is a front view of the upper transport hook drive with part of a magnetic sheet, FIG. 7 is a section along line VII—VII in FIG. 6, FIG. 8 is a face view of the upper range of the pivot frame in the first work position, FIG. 9 is a side view of the device shown in FIG. 8, FIGS. 10, 11 and 12 are views similar to FIG. 8 showing additional work positions, FIG. 13 is a diagrammatic rear view of the base frame in the range of the shears with a diagrammatic illustration of the shears in a first work position, FIG. 14 is an illustration as in FIG. 13 showing a second work position of the shears, FIG. 15 is an exact illustration of the parts cooperating with the shears in two different work position, FIG. 16 is a view only of the shears in the direction of arrow C of FIG. 13, FIG. 17 is a plan view of the upper not completely mounted shears arm, FIG. 18 is a front view of the upper not completely mounted curve sensor lever, FIG. 19 is a view according to arrow D in FIG. 18, FIG. 20 is a front view of the upper catch lever, FIG. 21 is a view according to arrow E in FIG. 20.

A storage apparatus 21 comprises generally a base frame 22, a pivot frame 23 and an exchangeable cassette 24. For the cassette 24 tracks and support elements not shown in the drawing are provided in the base frame 22 so that they may be inserted in the direction of the arrow A. In cassette 24 one hundred magnetic sheets are supported in a vertical position. An individual magnetic sheet 26 may be selected from among the one hundred magnetic sheets and moved out according to arrow A by a distance of 5 mm so that it projects with respect to the other magnetic sheets. Thereafter the pivot frame 23 may be pivoted in the manner indicated in broken lines until it has a predetermined position relative to the selected magnetic sheet 26. Thereafter a specific device grasps the magnetic sheet, pulls it completely out of the magnetic cassette 24, and transports it in a vertical position towards the left. Thereafter the pivot frame 23 pivots back into its position indicated in full lines, and transports the magnetic sheets 26 back into the cassette 24. During this operation the magnetic sheet 26 is read, inscribed or otherwise treated.

In the lower structure 27 of the base frame 22 coding slides 28 are provided which are movable upwardly. Above the coding slides 28 correspondingly exactly aligned slots 29 are provided in the bottom 31 and on the side walls of the cassette 24 so that the coding slides 28 may penetrate deeply into cassette 24, as far as they have been urged to move upwardly by a directing device not shown in the drawing.

FIG. 4 shows some of the coding slides 28 in their upper position and some in their lower position.

Each magnetic sheet 26 consists of a sheet of synthetic material having a thickness of about 0.15 mm, a length of about 21 cm and a height of about 18 cm. By means of an adhesive strip 32 an upper rider 33 and a lower rider 34 is attached in a plain manner. They are made of spring steel and have on their mutually facing edge in each instance an indentation 36 to which corresponds a projection 37 of complementary shape with an exact fit so that the riders 33, 34 and the magnetic sheet 26 are connected to each other in a horizontal direction also in a form fitting manner. Both riders 33, 34 have on their front face side 38 seen in the pull-out direction (arrow A) an indented recess 39 as well as in their outer face sides in proximity of this recess 39 a notch 41, so that a wide spring 42 is produced which yields outwardly upon the expansion of the recess 39. Each recess 39 presents at the top and bottom two rectangular hook recesses 43 which are aligned in a vertical direction. It would be basically possible to provide the hook recesses 43 separately from the recess 39. However, by combining them they can be punched with a single tool. At its upper face side the rider 34 presents additionally a pullout stop recess 46. The lower rider 34 presents here instead teeth 47 at a regular interval and therebetween spaces 48 which correspond in their width to the thickness of the coding slides 28 and are aligned also with the slots 29. By providing the coding slides 28, the slots 29 and the teeth 47 at the lower part has the advantage that one provides only a lower structure 27, and not a lower structure 27 as well as a corresponding upper structure which becomes necessary in that case. The slots 29 provide due to their being directed downwardly that no foreign elements can penetrate into the cassette 24. On their rear face side 49 the riders 33, 34 have both an indentation 51 which presents in the pull-out direction and in the direction facing the magnetic sheet 26 a first saw tooth section 52 followed by sharply dropping saw tooth section 53.

The magnetic sheets 26 are maintained level in spite of their sheet-like behavior by means of a device which is very simple but which fulfills its purpose completely. According to FIG. 5 an angle iron 54 is screwed at the lower rear portion of the cassette to its bottom 31 and its vertical portion 56 is aligned with the rear face side 49 of the rider 34 and its horizontal portion 57 bears against the horizontal lower part 58 of the indentation 51.

The angle iron 54 extends naturally transversely through the cassette 24 and transversely through all indentations 51.

An exactly identical angle iron is screwed inside at the top 59 of the cassette 24 and projects in a corresponding mirror image to the angle iron 54 into the upper indentation 51. This mounting is completely adequate to maintain the magnetic sheets 26 in the unit. In this arrangement the upper angle iron carries with its part corresponding to part 57 the magnetic sheets 26 and the riders 33, 34. Accordingly a force is exerted on this portion of the angle iron which is directed downwardly. On the other hand the lower angle iron 54 is loaded essentially only with its portion 56 and takes up the horizontal reaction force directed toward the left. Due to the light bending at portion 57 and due to the form of the lower side 58 or the corresponding side of the upper indentation 51 the riders 33, 34 find their way easily into the indentation 51 the riders 33, 34 find their way easily into the angle irons 54.

Figure 1:
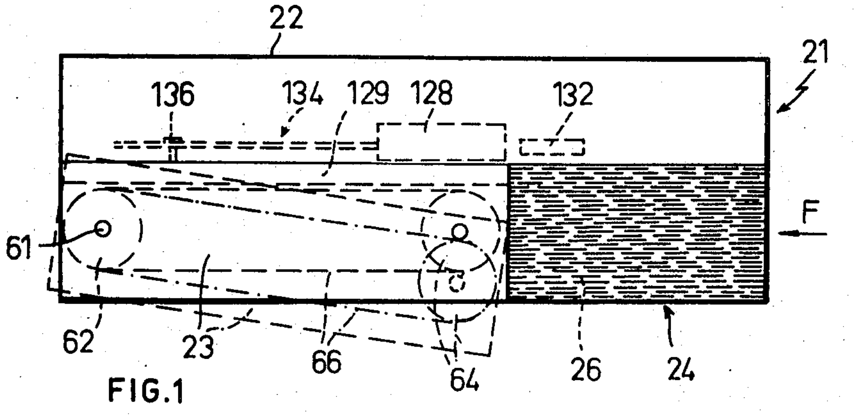
FIG. 1 is a substantially diagrammatic plan view of the storage apparatus.

The pivot frame 23 is pivotable by a maximum of 8 percent from its position shown in full lines in FIG. 1 into the position indicated in broken lines around a vertical shaft 61 which is connected at the top and bottom rigidly to the base frame 22. Due to this basic arrangement no substantially more expensive guides are required which would be necessary if it were desired to slide the pivot frame 23 parallel to itself. Furthermore the forces to be generated for a pivot movement are much smaller than those for a sliding movement parallel to itself because only the face side of the pivot frame 23 located opposite the cassette 24 needs to travel the maximum distance. On shaft 61 two gears 62 are provided which may be driven from the base frame 22 according to FIG. 1 either in the clockwise direction or in the counter clockwise direction and are aligned approximately at the level of the slots 39 of the riders 33, 34. As the shaft 61 and the gears 62 do not change their position to the base frame 22 during their pivot movement, the gears 62 may be driven in a simple manner independently of the location of pivot frame 23. Close to the right face side of the pivot frame 23 a further vertical shaft 63 is provided which carries at the upper and lower end gears 64 which are not driven and which are aligned at the level of the gears 62. The upper gear 64 is clearly illustrated in FIGS. 6 and 7.

Figure 2:
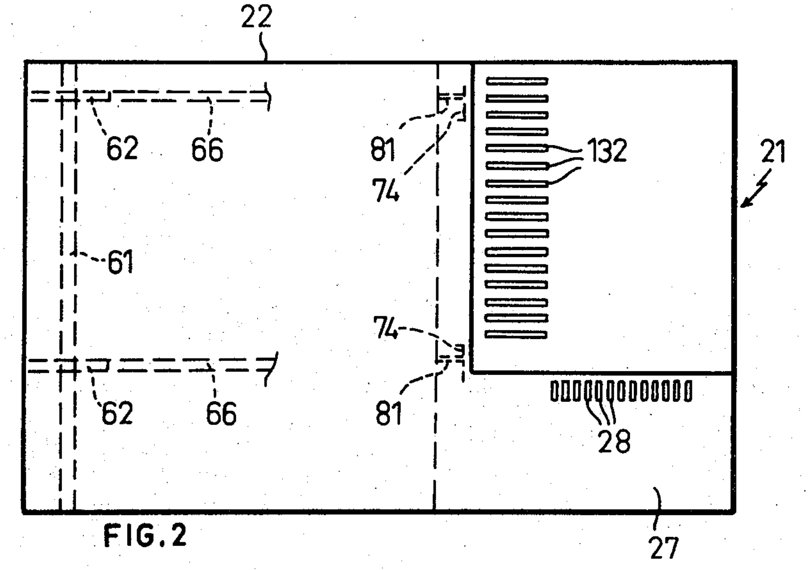
FIG. 2 is a front view according to FIG. 1.

The gears 64 are not driven. Between the upper gears 62, 64 and the lower gears 62, 64 a gear belt 66 is stretched in each instance. Each of these gear belts carries a follower pin 67 directed vertically upwardly or downwardly. This pin extends into a longitudinal opening 68 of a follower plate 69 disposed vertically to the transporting direction. The follower plate is rigidly connected to a guide piece 71 which presents a circularly cylindrical longitudinal bore 72. With this bore it slides on a circularly cylindrical guide rod 73 which extends on the side of the pivot frame 23 located on the side of the base frame horizontally parallel to the gear belt 66. The transport hook 74 is rigidly connected with the guide piece 71 and is mounted on an arm 76 of the guide piece 71 extending downwardly. The hook point 72 may penetrate into the hook recesses 43, 44 of the riders 33, 34 when a predetermined sheet 26 has been extracted by 5 mm from the magnetic sheet unit and the pivot arm 23 has been pivoted up to the extracted magnetic sheet. From FIG. 2 it may be seen that transport hooks 74 are provided at the top and bottom, and a transport hook 74 pertains to each endless gear belt 66. As may be seen from FIG. 7 the hook 77 points into the direction of the upward pivoting of the pivot frame 23. The illustrated arrangement is very simple. As may be seen from FIG. 7 the follower pin 67 is located in its rest position at 3:00 o'clock. If it moves further contrary to the clockwise direction toward 12 o'clock the transport hook 74 is not accelerated immediately at the full speed of the gear belt drive. Instead a gentle acceleration takes place so that only after a quarter revolution of the gears 64 the magnetic sheet 26 has reached its full speed. For the direction of the movement the transport hooks 74 are not alone responsible. Instead U-shaped rails 78 are provided above and below the riders 33 and 34 in the pivot frame 23. The upper U-shaped rail which is shown in FIG. 8 is open at the bottom while the lower corresponding U-shaped rail is open at the top. Their interval defines a transport track 79 which is shown in FIG. 8 and naturally is positioned vertically and is parallel to the travel of the transport hooks 74.

Figure 3:
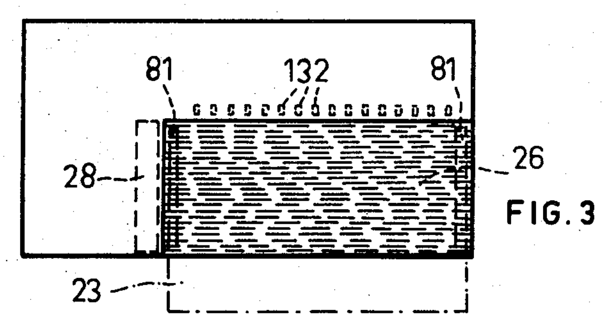
FIG. 3 is a view according to arrow F in FIG. 1.

In the front face side of the pivot frame 23, top and bottom, are mounted also two pull-out rods 81. These rods are guided in horizontal guides 82 (FIG. 9) but are shown for the purpose of clarity in the drawings only in FIGS. 2, 3 and 4. The pull-out rods 81 are slightly but specifically thicker than the indented recesses 39 of the riders 33, 34 are wide. In order that the pull-out rods 81 find their way into the recesses 39 easier they are provided at their front face side with two symmetrical chamfered edges 83. Their rest position is shown in full lines in FIG. 4 while their advanced position is illustrated in a dash and dot line.

Racks 86 are provided ahead of the front face side of the pivot frame 23 at the base frame 22 by means of angle irons 84 (FIG. 8) - (FIG. 12) wherein the saw teeth 87 of the upper rack are directed downwardly and the saw teeth of the not illustrated lower rack point upwardly. The racks 86 extend horizontally. As described above the following description is directed only to one functional unit as the other functional unit which is arranged at the lower part is correspondingly symmetrical.

A bearing plate 88 formed as a U-shaped angle iron is attached by means of screws 89 to the front face side of the pivot frame 23. It holds a shaft 91 in which the upwardly directed tab 92 of the bearing plate 93 arranged above the U-shaped rail 78 is mounted. For the shape of the bearing plate reference is made to FIGS. 8 to 12. In the right upper corner of the bearing plate 93 a bolt 94 is located in which a stop plate 96 is pivotally mounted. It is adapted to catch with its left upper tooth 97 in the saw teeth 87. A tension spring 98 is attached below the tooth 97 and pulls downwardly and to the left while its other end is fixed to a limit plate 99 which is screw-fastened to the pivot frame 23. An eye 102 of the bearing plate 93 and shown in broken line has a horizontal longitudinal opening 103 and is located below the upwardly bent tab 101 of the limit plate 99. A pin 104 extends into this longitudinal opening and is rigidly connected to the tab 101. By means of a tension spring 106 a traction is exerted at the bearing plate 93 in the clockwise direction around the shaft 91. In its position shown in FIG. 8 the stop latch 96 has been swiveled clockwise because it abuts against an abutment screw 107 fixed to the base frame under the impact against the force of the tension spring 98. In the counter-clockwise direction the stop latch 96 can move as far as an abutment pin 108 which is rigidly connected with the face side of the pivot frame 23 and traverses the bearing plate 93 in a bore 109 which has an appropriate size such that the abutment pin 108 does not abut in the bore 109 in the two extreme positions of the bearing plate 93 but merely serves as abutment for the stop latch 96.

From the lower left obliquely to the upper right extends an identation 111 with an open edge in the stop latch 96 which encloses in a form fitting manner a follower pin 114 of a sensor latch 113. This latch is mounted by a stud 115 on the bearing plate 93 above its lower edge. Its extension 116 projecting upwardly and to the right carries the stud 114. Its leg 117 extending downwardly is bent at right angle at its lower end and is formed there into a foot 118 which carries a sensor plate 119 at its front end. The shape is so designed that during pivot movements of the sensor latch 113 the sensor plate 119 can come to lie below the transport hook 74, can abut in the case of an extracted magnetic sheet 26 against its upper rider 33, but touches no other parts.

In the following description it will be explained how the pull-out and transporting action of the magnetic sheet is carried out: A magnetic sheet with the reference 174 is to be handled. On this magnetic sheet the teeth 74 corresponding to the position values 7 and 4 are broken off, and only on this magnetic sheet. The data handling machine to which the storage apparatus 21 is connected directs now in a known manner the coding slides into the space 1 of the unit plate (left), the space 7 of the decade place (centre), and the space 4 of the hundredth place (right). The pullout stop 121 is guided from the base frame through the top 59 of the cassette 24 into the pull-out stop recess and furthermore the upper and lower arresting guard 122 is guided also from the base frame from the position shown in full lines in FIG. 5 against the force of the tension spring 123 into its dot and dash line position. In this way the straight edge 124 fixed to the guard is withdrawn from all saw tooth sections 52 of all riders 33, 34. Now the upper and lower pull-out rod 81 is inserted uniformly into all indented recesses 39, and the recesses expand. Thereafter the pull-out rods 81 move again to the left. After a pull-out travel of 5 mm the pull-out stop 46 abuts with its rear edge against the pull-out stop slide 121, the magnetic sheet 26 remains in place, the pull-out rods 81 move further back into their starting position and slide out of their indented recess 39. Simultaneously the straight edges 124 have moved also again inwardly along the saw tooth sections 52. Asuming that during this operation the pullout rods 81 had lost the magnetic sheet 26, e.g. because the friction between the indented recess 39 and the rods was not sufficiently large then the straight edges 124 would have struck during the inward movement against the vertical saw tooth section 53 of the magnetic sheet 26 remained in place and would have brought the sheet completely into the position shown in dot and dash lines. The arresting guards 122 thus not only hold the magnetic sheet 26 in the unit so that they do not drop out of the front from the cassette when it is moved, for example to be transported. The arresting guards 122 with their straight edges 124 have rather the effect that within the time interval provided for this purpose the selected magnetic sheet 26 is moved positively into the position shown in dash and dot lines. The interval of the saw tooth section 53 from the face side 49 measured in a vertical direction is equal to the pull-out travel of 5 mm. At the end of the selection process all the coding slides 28 and the pull-out stop slide 21 are outside of the engagement with the riders 33, 34.

Seen from the front side as indicated in FIG. 4 the hook point 77 is aligned now with the hook recess 43, 44 but is not yet in engagement. In order to obtain this the base frame 22 pivots the pivot frame 23 in the clockwise direction as shown in FIG. 1. Now the abutment screw 107 abuts no longer against the stop slide 26, the tension spring 98 pulls it together, pivots the stop latch 96 against the clockwise direction and moves the sensor latch 113 over the stop 114 from its 5:00 o'clock position according to FIG. 8 into its 7:00 o'clock position according to FIG. 10. The sensor plate 119 is pivoted thus in front of the transporting track 79. In the course of the pivot movement the sensor plate 119 engages the selected magnetic sheet 26, or more exactly its upper rider 33. As can be seen from the drawings the lever arm between the sensor plate 119 and the stop 115 is about four times as large as the interval between the stop 115 and the stud 114. The rider 34 is therefore used to only a small degree and it projects anyway only a few millimeters from the unit of the other magnetic sheets. The stop latch 96 is moved against the force of the sensor spring 98 from its 8:00 o'clock position into the 9:00 o'clock position and its tooth 97 engages one of the saw teeth 87 of the rack 86. In this manner the stopping process is initiated. The pivot frame 23 may move yet a small distance outwardly and in fact as far as the limit pin 104 has abutted to the left in the longitudinal opening 103 as shown in FIG. 12. Thus also the bearing plate 88 ispivoted a small distance around its shaft 91 contrary to the clockwise direction. In this manner the sensor plate 119 comes out of engagement with the rider 33 and rubs no more therealong (FIG. 12) when the magnetic sheet 26 is now pulled into the pivot frame 23. The hook point 77 has now penetrated into the hook recesses 43, 44 and the tooth belts 66 are set into motion. Thereby the transport hooks 74 move according to FIGS. 1, 2, 6 and 7 to the left and pull in the magnetic sheet 26 on the transport track 79. When the magnetic sheet 26 is pulled in completely, the pivot frame 23 is pivoted back. The magnetic heads 128 which are moved up and down on the vertical guide rods 126 and 127 are now brought to a level which corresponds to the track of the magnetic sheet 26 to be read. Thereupon the tooth belts 66 are moved in the reversed direction. Now the transport hooks 74 push the magnetic sheet 26 past the magnetic heads 128 and into the cassette 24. Itis advantageous for an exact adjustment that in the pivot frame 23 between and adjacent the magnetic heads four webs 129 are provided so that the magnetic sheets 26 have always a predetermined settling surface on their back side. The magnetic sheets 26 may thus be withdrawn selectively from the cassette 24. During the return transporting they are always deposited in the inner area of cassette 24, as shown in FIG. 1. In the cassette 24 at whose rear wall pressure straps 131 are provided which are illustrated diagrammatically in FIG. 7. These straps push the deposited magnetic sheet 26 forwardly and thus slide it simultaneously off the hook point 77. The deposited magnetic sheet 26 is fully moved into the magazine only when during a following selection process the pull-out rods 81 are moved forward again. This process serves also to straighten out the magnetic sheets 26 in a straight line.

In the base frame 22 track setting slides 132 are provided which are disposed above one another and which may be aimed by the control unit of the data handling apparatus similar to the coding slides 28. In the unaimed state the track setting slides 132 are all in their retracted position while the aimed track setting slide projects. Horizontal slits in the front wall 132 of a slide box fixed to the frame is used to guide the forward area. Because of its particular level a track setting slide 132 indicates which track of the magnetic sheet 26 should be worked.

In order to bring the magnetic heads 128 to the right level and holding them there a shears 134 is provided which is illustrated in FIG. 13. A bolt 136 is rigidly fixed horizontally on the base frame 22. At its free end it carries pivotably a pivotable joint bar 135 directed according to FIG. 13 at 3:00 o'clock. This joint bar carries at its right end a horizontal bolt 140 which constitutes the crossing point of two shears halves 137, 138. A spring 139 presses the shear halves 137, 138 apart as far as this is permitted by two rollers 141, 142 which travel on track curves 143, 144. These track curves 143, 144 are symmetrical to a plane extending horizontally through the bolt 136 and has areas 146 located at a greater distance from each other and areas 147 located at a substantial distance from each other. In the position shown in FIG. 13 the shears is therefore opened completely and symmetrical to this plane. This is the starting position of the shears 134. At the left extremities of the shears halves 137, 138 guide surfaces 148, 149 which are parallel to each other are provided which enclose rollers 151 mounted rotatably on guide blocks 152, 153. The guide blocks 152, 153 are mounted at the guide rods 126, 127 so as to be movable up and down parallel to each other. The lower guide block 153 carries also the magnetic heads 128.

The track curves 143, 144 are rigidly connected to a vertical shaft 154 which is rotatably mounted in the base frame 22. When the rollers 141, 142 are located in the areas 146 which are at a substantial distance from each other the shears is fully open according to FIG. 13. When the shaft 154 rotates the rollers 141, 142 approach each other due to the areas 147 that are more proximate to each other, the force of spring 139 is overcome and the shears 134 closes. Assuming now that according to FIGS. 13 and 14 one of the upper track setting slides 132 projects from the front wall 133. On closing of the shears the nose 156 of the upper guide block 152 coming down from above strikes first against the track setting slide 132. Now the guide block 152 cannot move any further downward. The shaft 154 continues rotating nevertheless and keeps closing the shears more and more. Because of the joint bar 135 the lower shears half 138 can now be lifted beyond the center point until the nose 157 of the guide block 153 strikes from below against track setting slide 132. This condition is indicated in FIG. 14. During this procedure the joint bar 135 has pivoted from its 3:00 o'clock position to the 2:00 o'clock position. If a track setting slide 132 had to be sensed further down the nose 157 would have first struck and the procedure just described would have taken place toward the other side. The joint bar 135 would have been pivoted in that case into the position shown in broken lines in FIG. 14. This manner of track setting works very rapidly because already after a half revolution of the shaft 154 the track is set. By means of a sliding transition between the areas 146 and 147 the shears halves 137, 138 may be optimally accelerated. Independently of the position of the track setting slides 132 one has a constant setting time. Tolerances of the structured parts have no substantial influence as the only decisive factor is that the track setting slide 132 has the correct height position and the shears 132 may be able to close. Instead of a guiding by means of a joint bar 135 one could also select a more complicated guiding of the bolt 140 through a vertical straight line guiding similar to that of the guide blocks 152, 153. Instead of pressing the right ends of the shears halves 137, 138 against each other by means of the track curves 143, 144 one could also press them against each other, e.g., by means of magnets. The basic structure described above has the advantage that it is very simple and may be adapted exactly into the working cycle. As in all other structural parts of the storage apparatus the movement of the shaft 154 may be obtained easily by means of guide curves of the conventional type.

It could happen that due to some error two track setting slides 132 project from the front wall 133. For this reason it is necessary to provide a device which permits that one or both shears halves 137, 138 can yield so that the two track curves 143, 144 can close the shears 144 merely up to the two track setting slides 132. In order to facilitate the yielding without creating difficulties the following construction is provided which is explained on the basis of the upper shears half 137. It comprises a shears arm 158, a curve sensor lever 159, a locking latch 161, a bearing angle piece 162 and a tension spring 163. At the top of the shears arm 158 the two guide services 148, 149 are provided. A stop 166 is riveted into a bore 164 and one end of the tension spring 163 is attached to this stud. A stud 169 is riveted to a projection 167 directed downwardly and the stud is located in a bore 168 and directed inwardly. The inner end of the shears arm 158 is designed in the form of a bridge 171 which has two cheeks 172, 173. The bearing angle piece 162 is screwed in two bores 174 and sits on the cross piece 176 of the bridge 171. At the back side the bridge 171 changes into two parallel eyes 177, 178 which are traversed by bolt 140.

The curve sensor lever 159 has also a bridge 179 with two cheeks 181, 182 which are disposed vertically thereto. This bridge 179 fits under bridge 171. The cheek 181 changes over into an eye 185 whose bore 183 is aligned with a bore 184 of the tail 186 directed towards the right. After a double bend 187 the tail 186 presents a cross bore 188 in which a bore 189 is riveted which carries the roll 142 axially non-slidably. The bore 183, 184 is traversed by bolt 140 which traverses also the eye 177, 178 of the shears arm 158. A spiral spring 191 is also wound around bolt 140 as replacement of spring 139 and its ends 193, 192 lie against the underside of the cross-piece 194 of the bridge 179 and urge the shears 134 to open. The stop latch 161 is mounted on the cross shaft 196 of the bearing angle piece 162 and the particular shape of the stop latch 161 can be seen readily in FIGS. 20 and 21. With regard to the shape of the other parts of the shears 134 particular reference is made to FIGS. 15–21 which are illustrated true to scale.

The bearing angle piece 161 is a double armed lever whose one lever 197 extends approximately parallel to shears arm 158 and has several bores 198, and in one of which the tension spring 163 is attached. Therefore the bearing angle piece 161 is pretensioned in the counter clockwise direction.

The other lever 199 has a leg 201 which is disposed vertically relative to lever 197 which bends down vertically over a knee 202 and forms a second leg 203.

The cheek 181 of the curve sensor lever 159 continues to the left and forms a beak 204 in whose bore 296 a rearwardly extending bolt 207 is riveted. This arrangement is so designed that the bolt 207 is disposed slightly to the right relative to the vertical which can be established on the geometrial longitudinal axis 208 of the shears and bears against the upper face surface 209 of the leg 203. This face surface 209 is curved slightly toward the geometrical longitudinal axis 208. For the exact setting of this configuration two setting screws 211 are provided which are lodged in bores 212 of the cross-piece 176 of the shears arm 158. They press with their lower surface against the upper side of the cross piece 194 of the curved sensor lever 159.

This device constitutes a yieldable overload device which maintains the shears arm 158 and the curve sensor lever 159 in a predetermined manner rigid relative to the geometrical longitudinal axis 208. However, when the track curve 144 pushes the curve sensor lever 159 upwardly and the shears arm 158 cannot move downwardly because it strikes too early against an inadvertently also selected track setting slide 132, the roller 142 with pivot point around the bolt 140 pushes the bolt 207 downwardly. In this operation the stop latch 161 is pivoted around the cross shaft 196 slightly in the clockwise direction. This in turn causes the face surface 192 to position itself further obliquely to the geometrical longitudinal axis 208, i.e., that the angle enclosed with it becomes steeper. During the further procedure the bolt 207 glides then on the face surface 209 completely further down. The bolt 207 will slide fully down when the two track setting slides 132 are sufficiently far apart. In that case the underside 213 of the beak 204 bears against the stud 139. The pivot travels that have taken place up to that point are quite sufficient to make the curve sensor lever 195 travel through the path designated for it although the shears arm 158 remains in place.

The return positioning of the yielding mechanism is carried out during the subsequent opening of the shears. In FIG. 15 the shears 134 is shown in its starting position in engagement with the upper and lower guide block 152, 153. Furthermore the position of the guide block 152, 153 with the magnetic head 128 is shown in this Figure in the sensing position. The geometrical longitudinal axes 214, 216 show which position the shears halves 137, 138 take up in that case.

In the event a spring 139 is provided which tends to pull the shears arms 137, 138 together supplemental track curves 143, 144 are necessary which push the rollers 141, 142 apart against the force of the spring 139.

As may be seen from FIG. 15 the noses 156, 157 are collapsed so that they can push track setting slides 132 which have remained outside into the front wall 133 while they pass by. The track setting slides 132 can deflect in this direction because they are mounted resiliently in this direction in the slide box.

What is claimed is:

1. Storage apparatus for the cycled selection of a sheet-like records carrier which is supported among a plurality of records carriers on a rider consisting of a steel band on at least one of its edges and disposed in a vertical direction, an indented recess being provided in a face surface of the rider located perpendicularly to the direction of movement, this recess having in the unstretched condition a width that is slightly smaller than the effective cross-section of a rod which is movable transversely to its longitudinal direction into this recess and in the pull-out direction while expanding the recess, the force generated by this expansion being larger than the harmful forces retaining the records carrier in its original position and generated by adhesion, pressure or the like, characterized in that the records carriers 26 are maintained in a cassette 24 which is open at its rear face wall in the pull-out direction A, that a number of records carriers 26 which is relatively small compared to other storage apparatus, e.g. a maximum of 200 records carriers, are kept in the cassette 24, that the cassette 24 is slidably mounted in a base frame 22 which has the selector device for the records carrier 26 and engages by means of coding rods 28 into coding recesses 48, that a pivot frame 23 is provided which is pivotable around the vertical shaft 61 in its area remote from the cassette 24, is higher than the records carrier 26, and may be moved during the pivot movement with its side facing the cassette 24 at its open face wall essentially up to a selected projecting records carrier 26, wherein the largest angle between the pivot frame 23 and the records carrier 26 is at most as large as the maximum permissible supplemental yielding angle of the records carrier 26 occurring repeatedly during the selection, that the pivot frame 23 has a transport device 82, 122 which engages at the rider 33, 34, the records carrier 26 being moved by this transport device in a guide 78 of this pivot frame 23 in the direction of its vertical shaft 61, that the pivot frame 23 is pivoted back into its starting position when the records carrier has retracted, that in base frame 22 a height adjustable reader-writer device 128 is provided, whose working plane 97 is located in the plane of the records carrier 26 guided by the return pivoted pivot frame 23, that oppositely reader device 128 on the pivot frame 23 directly behind the records carrier 26 a large support surface 129 is provided, that the return transport is carried out in the back pivoted position of the pivot frame 23 into the cassette 24, and that during the straight line return transport the reader device 128 is in the work position.

2. Storage apparatus according to claim 1 characterized in that the records carrier 26 has a rider 33, 34 each at its upper and lower edge, for which in the pivot frame 23 each an upper and lower guide rail 78 is provided and that below the upper and above the lower guide rail 78 each a transport hook 74 is provided which fits into a correspondingly shaped hook recess 43 of the rider 33, 34 and are movable synchronously back and forth along the guide rail 78.

3. Storage apparatus according to claim 1 characterized in that the riders 33, 34 present at their rearward end and in the pullout direction A each an indentation 51 which has a first saw tooth edge 52 directed toward the pull-out direction A and the records carrier 26 and an inwardly contiguous more deeply dropping saw tooth edge 53 and that a straight edge 124 each is provided which may be actuated by the base frame 22, the straight edge being movable adjacent to and longtiudinally of the first saw tooth edge 52 after the movement in the pull-out direction of the rod 81 and transports before the end of the movement in the pull-out direction A any riders 33, 34 which have inadvertantly remained in place further in the pull-out direction A.

4. Storage apparatus according to claim 1 characterized in that at least one rider 33 presents a pull-out stop recess 46 in its outer longitudinal edge into which a pull-out stop straight edge 121 actuated from the base frame 22 is movable.

5. Storage apparatus according to claim 2 characterized in that the indented recesss 39 for the rod 81 and the hook recess 42, 43 are a common recess.

6. Storage apparatus according to claim 1 characterized in that the lower rider 34 carries the coding recesses 48.

7. Storage apparatus according to claim 1 characterized in that in the cassette 24 the records carrier 26 is supported in the rearward indentation 51 of its upper rider 33 downwardly, and in the rearward indentation 51 of its lower rider 34 forwardly and is otherwise not supported and is essentially held plane due to this type of support and the rigidity of the riders 33, 34.

8. Storage apparatus according to claim 1 characterized in that a sensor device 130 is provided which determines the spot of a records carrier 26 which is pulled out by its front edge a short distance and has a stop device 86, 96 which stops the pivot movement of the pivot frame 23 which stops the pivot movement when the transport hook 74 is positioned in the transport recesses 42, 43.

9. Storage apparatus according to claim 8 characterized in that on the base frame 22 a rack 86 is rigidly secured which extends in the pivot direction of the pivot frame 23 and that at the face side of the pivot frame 23 a sensor latch 113 is provided which upon striking a pulled out records carrier 26 locks a stop latch 96 mounted on the pivot frame 23 with the rack 86.

10. Storage apparatus according to claim 9 characterized in that the sensor latch 113 and the stop latch 96 are pivotally mounted on a common bearing plate 93, the bearing plate 93 being movable between two abutments 103, 104 by a short distance in and away from the pivot direction of the pivot frame 23, that the bearing plate 93 is maintained in its rest position by spring 106 and that upon the engagement of the stop latch 96 into the rack 86 the stop latch 96 moves due to its positioning moves the bearing plate 93 against the pivot direction of the pivot frame 23 and lifts the sensor latch 113 off the records carrier 26.

* * * * *